United States Patent [19]

Lehureau et al.

[11] 4,308,545
[45] Dec. 29, 1981

[54] PROTECTED OPTICAL DISC

[75] Inventors: Jean-Claude Lehureau; Henriette Magna; Michel Thirouard, all of Paris, France

[73] Assignee: Thomson-CSF, Paris, France

[21] Appl. No.: 78,728

[22] Filed: Sep. 25, 1979

[30] Foreign Application Priority Data

Sep. 29, 1978 [FR] France ................. 78 27920

[51] Int. Cl.³ ............................................ G01D 15/34
[52] U.S. Cl. .................................. 346/135.1; 346/137; 430/945; 430/961
[58] Field of Search ................. 346/135.1, 137, 76 L; 420/945, 961

[56] References Cited

U.S. PATENT DOCUMENTS

| 4,001,840 | 1/1977 | Becker | 346/76 L |
| 4,038,663 | 7/1977 | Day | 346/76 L |
| 4,074,282 | 2/1978 | Balas | 346/135.1 |
| 4,264,911 | 4/1981 | Wilkinson | 346/135.1 |

Primary Examiner—Joseph W. Hartary
Attorney, Agent, or Firm—Cushman, Darby & Cushman

[57] ABSTRACT

This disc has a layer of an inscribable and optically legible recording material deposited on a transparent plate traversed by the recording or reading beam and protected from the outside by a cover formed for example by a metal sheet, whose two surfaces are fixed to the layer so as to form a space in front of the latter.

8 Claims, 2 Drawing Figures

PROTECTED OPTICAL DISC

BACKGROUND OF THE INVENTION

The present invention relates to a protected optical disc used for the recording of information in the form of video or digital signals.

It is known that in order to obtain a high information density on a relatively compact carrier it is advantageous to use an optical disc having at least one layer, whose physical characteristics vary as soon as it is exposed to radiation in which the information is recorded by means of a focused light beam in the form of diffracting microelements, which can then be detected by means of another focused light beam for the purpose of reading the information. In order to permit easy, frequent manipulations by a user the commercially sold pre-inscribed or blank disc must have a protection to obviate any influence of dust, finger marks, etc., on the disc and also to prevent any deterioration of the radiation-sensitive layer.

The manufacture of pre-inscribed discs is based on the pressing of a transparent support from a matrix carrying the information to be reproduced on a large number of discs. The manufacturing operations are performed in a dust-free atmosphere, great care being taken to ensure that the optical support is not deformed. The discs obtained carry an optically legible information, but they cannot be recorded by the user.

It is much more complicated to produce discs which can be inscribed by the user, because it is necessary that the protection added to the layer used for recording the information does not disturb the passage of an information-modulated focused light beam. Furthermore the recording procedure must not require development. Inscribable discs are known which comprise a layer which undergoes a permanent modification under the action of an inscription radiation placed between two plates, one of which is transparent, the layer being deposited on one of the plates. The two plates are separated by shims in order to provide a free space in front of the layer to permit the giving off of decomposition products, for example metal vapours when the layer is a volatilisable metal layer. The need to make shims with a strictly constant thickness so as not to destroy the flatness of the plates, which must themselves be sufficiently thick and rigid to ensure a good protection and the assembly of the whole unit leads to high production costs.

BRIEF SUMMARY OF THE INVENTION

The present invention makes it possible to obtain an uncomplicated and relatively inexpensive disc. The disc according to the invention does not use shims for making a space in front of the recording layer. As this layer is deposited on a standard transparent plate with a thickness of approximately 1 mm onto the plate-layer assembly is fixed a protective cover whose very shape ensures contact at the edges of the disc and around the central hole of the disc whilst a closed space is made between these two circular contacts. To this end the cover is made from a metal sheet, involving a low raw material cost, by punching and shaping by means of a simple tool. Shaping can be carried out without any special precautions, because no optical qualities are required of the cover. The transparent plate covered with the recording layer undergoes no shaping. As a result there is no risk of the assembly being damaged by these manipulations. According to the invention a recording layer is used which is constituted by a highly plasticized thermodegradable layer and an extremely thin metal layer. This leads to a very good sensitivity with a medium power laser source. The use of a stamped metal cover leads to further improvements compared with known discs. It is for example possible to obtain an electrochemical protection of the metal ablation layer forming part of the recording layer.

BRIEF DESCRIPTION OF THE DRAWINGS

The invention will be explained in greater detail hereinafter relative to non-limitative embodiments and with reference to the attached drawings, wherein show.

DETAILED DESCRIPTION OF THE PREFERRED EMBODIMENTS

Figure 1:
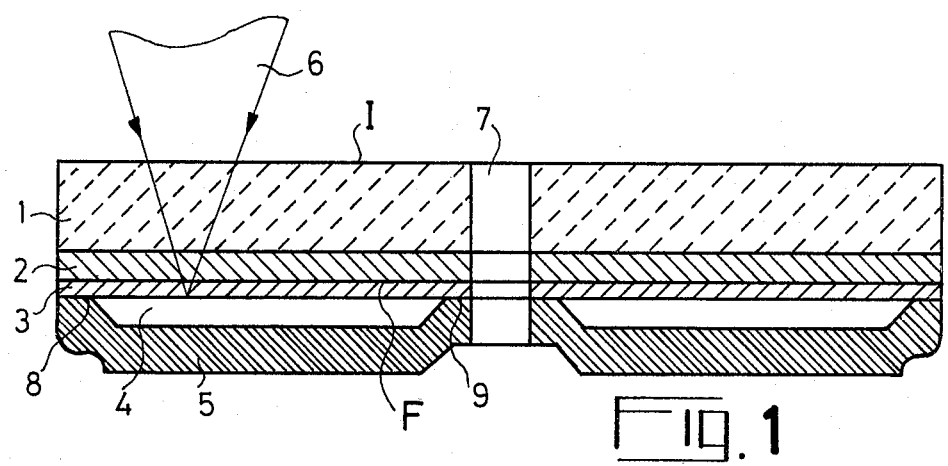
FIG. 1 a disc according to the invention.

FIG. 1 shows in radial section a protected optical disc according to the invention. All the elements of the disc are coaxial and there is a central hole 7 for the passage of a rotation spindle forming part of a recorder or an optical reader. It comprises a transparent plate 1, preferably made from a plastic material such as polyvinyl chloride, polymethyl methacrylate and polycarbonate. The surface quality of this plate must be compatible with the satisfactory operation of the follow-up controls of the recorders and readers. Such requirements are not very severe and can be obtained with standard plates. Plate 1 has a thickness of about 1 mm and it serves to receive a light beam 6 (for recording or reading), whose focusing plane is outside the plate and whose diameter during its passage through the plate is also approximately 1 mm. Thus, dust, scratches and dirty marks will not cause any significant variations in the energy distribution of the recording spot.

The face of plate 1 opposite to the incidence face I of beam 6 is covered by a heat sensitive layer. As this disc is particularly intended to be inscribed by the user and read directly, i.e. without prior developing, preference is given to the use of heat sensitive layer of the type described in French Patent Application No. 76 31 867 filed by the present applicant Company, i.e. constituted by a first layer 2 which is thermodegradable at low temperature (approximately 100° to 150° C.) deposited by immersion or centrifuging on the transparent plate and a second metal layer 3 deposited on layer 2 by vacuum evaporation or chemical deposition. Layer 2 has a relatively small thickness of approximately a few $\mu$m. Its face F, opposite to the contact face with plate 1 must be perfectly ground because it forms the focusing plane of beam 6. The metal layer 3 deposited on face F has a very limited thickness (approximately 1/100 $\mu$m). Such a layer is highly absorbent at the wave length of the inscription radiation, said radiation coming from a laser source which is able to supply a spot of a sufficiently small size for the inscription of microelements in the focal plane of a lens regulated in such a way that it coincides with the plane of layer 3. With a thickness of about 1/100 $\mu$m such a layer is able to absorb more than 60% of the radiation and the thermal energy due to the light spot continues to be concentrated in the vicinity of the spot. As the thickness of the thermodegradable layer 2 is well below the penetration depth of the inscription radiation into the material forming the same most of the radiation is transmitted to metal layer 3, which is locally rapidly heated to a temperature of about 100° to 200° C. This heating is diffused towards the thermodegradable layer 2, which is thus heated to its degradation temperature and the areas thereof in contact with the heated metal zones are destroyed. This degradation brings into force complex mechanical and chemical phenomena which attack the metal layer in the zone which has diffused the heat, but not in adjacent zones. Thus, diffracting microelements which are optically legible by reflection are obtained when the beam 6 comes from a low power laser. During recording decomposition products must be able to escape from the heat sensitive layer. It is therefore necessary to provide a space behind the metal layer 3, whilst ensuring the protection of said layer and the rigidity of the whole disc. To this end the disc also has a protective cover 5, which forms the base of the disc opposite to transparent plate 1. According to the invention this cover is made from a sheet, whose mechanical properties ensure the desired rigidity. The material used is an organic or metallic material, e.g. aluminium, in such a way as to ensure low raw material costs and maximum ease of machining. The initial sheet is stamped so as to give it the shape shown in FIG. 1 and provides the desired closed space 4 and contact surfaces in the form of rings coaxial with the metal layer 3 at the edge of the disc (surface 8) and in the vicinity of the central hole 7 of the disc (surface 9). Such a cover is easily made, is easy to fit on the remainder of the disc and gives both a good rigidity and flatness of the assembly.

Figure 2:
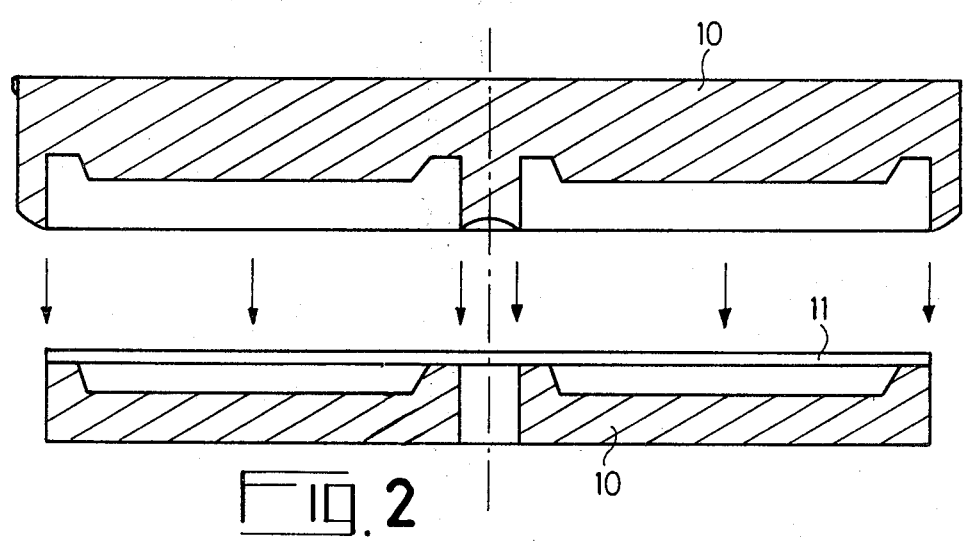
FIG. 2 the construction of the cover from a metal sheet.

To produce such a cover 5 from a metal sheet it is possible to use a punching and shaping tool such as that shown in cross-section in FIG. 2. Starting with a flat metal sheet 11, whose thickness is approximately 500 $\mu$m by using the press-matrix assembly 10 a central hole and the impression of the sheet between surfaces 8 and 9 so as to form a cavity are performed simultaneously. This pressing process can be carried out without any special precautions and no mechanical operation has to be carried out on the remainder of the disc which, whilst unprotected by the cover, must be kept in a clean atmosphere protected from dust and deformations. Thus, the only operation to be carried out carefully is the adhesion of the cover to the metal layer 3, but the latter operation can be easily performed.

The way in which the stamped metal cover is made offers the additional advantage of the chemical protection of the metal layer 3. Thus, as the gas in cavity 4 is air over a period of time oxidation may occur and this would obviously reduce the thermal and chemical properties of the layer. The invention offers various different possibilities for providing protection and namely the deposition on the inner face of the cover of a metal which is more electropositive than the metal from which layer 3 is formed, e.g. zinc or manganese. Deposition can be carried out by evaporation, or by electrochemical process. Another possibility of giving a chemical protection comprises depositing on the inner face of cover 5 an organic layer containing in suspension metal particles or unsaturated metal oxides, for example a minimum paint.

The invention is not limited to the embodiments described and presented hereinbefore and various modifications can be made thereto without passing beyond the scope of the invention.

What we claim is:

1. A protected optical disc for the recording of information comprising a transparent supporting plate and a further support said further support having central and edge ring shaped contact surfaces and therebetween a recess for forming with said supporting plate a chamber insulated from the outside, and supported by said supporting plate within said chamber facing said further support a metal layer inscribable and optically legible by reflection using a radiation beam traversing said supporting plate; the inner face of said further support being provided with an antioxidant deposit extending in said chamber for preventing oxidation of said metal layer.

2. A disc according to claim 1, wherein said deposit is a metal; said metal being more electropositive than said metal layer.

3. A disc according to claim 1, wherein said deposit is a layer of organic material containing an antioxidant material.

4. A disc according to claim 3, wherein said antioxidant material is in the form of metal particles.

5. A disc according to claim 3, wherein said antioxidant material is an unsaturated metal oxide.

6. A disc according to claim 1, wherein said metal layer has a ring shaped inscription region bounded by coaxial outer and inner rings; said recess being an annular chamber overhanging said inscription region; said further support resting on said supporting plate along said coaxial outer and inner rings.

7. A disc according to claim 1, wherein said further support is a body of organic material having an annular depression, a central hole and two ring shaped coaxial bearing areas bounding said annular depression.

8. A protected optical disc for the recording of information comprising:
 a transparent supporting plate;
 a stamped sheet of metal forming a further support and having an annular depression, a central hole and two ring shaped coaxial bearing areas bounding said annular depression, said depression facing said supporting plate and forming a chamber insulated from the outside;
 a structure on said plate and extending in said chamber, inscribable and optically legible by reflection using a radiation beam traversing said supporting plate; and
 an anti-oxidant deposit on said further support and within said chamber.

* * * * *